Sept. 19, 1961   J. B. NICOLAS   3,000,523
ROAD VEHICLES
Filed Dec. 16, 1958   2 Sheets-Sheet 1

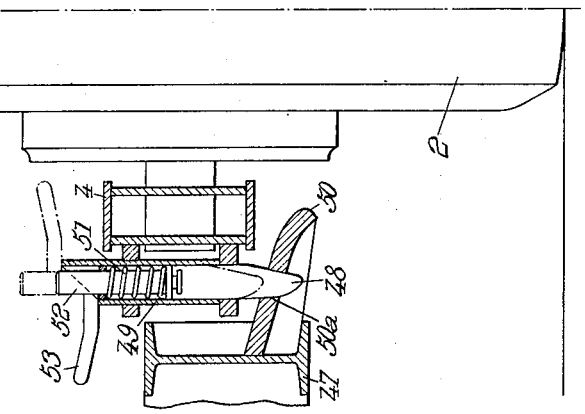
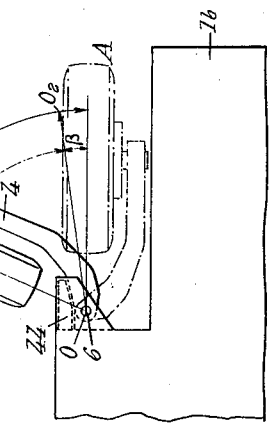
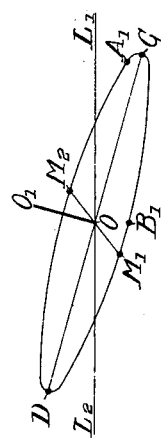
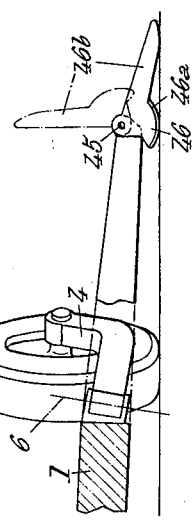

United States Patent Office 3,000,523
Patented Sept. 19, 1961

3,000,523
ROAD VEHICLES
Jean Bernard Nicolas, 11 Ave. Jean Jaures,
Auxerre, Yonne, France
Filed Dec. 16, 1958, Ser. No. 780,787
Claims priority, application France June 27, 1958
13 Claims. (Cl. 214—505)

This invention relates to automotive or trailer road vehicles adapted to carry leavy loads. More particularly, this invention is concerned with vehicles of the kind wherein the wheels are supported on each side of the load carrying platform by arms hinged to the vehicle frame about an axis at an angle to the vertical in such a manner that when the wheels are swung apart from their normal running position the platform may sink to facilitate loading and unloading operations.

In such a vehicle when the wheel supporting arms have been unlocked, if the vehicle is moved backwards the wheels will swing apart until the corresponding end of the platform rests on the ground to form an inclined plane whereon the loading or unloading operations may easily be performed. When the vehicle is thereafter moved forwards, the wheels are returned inwardly and the wheel carrying arms may again be locked at their normal running position.

When the vehicle is heavily loaded it may become difficult or even impossible to return the wheel carrying arms fully to normal running position. Also starting of the vehicle may be braked by the rear end of the platform being applied on the ground by the load supported by the platform.

A first object of this invention is to provide a vehicle with swinging wheel carrying arms wherein said arms will automatically return inwardly to normal running position when the vehicle is advanced, even if the platform thereof has been heavily loaded.

A further object of this invention is to provide means to facilitate starting of the vehicle which is independent of and free from being hindered by the braking effect resulting from the rear end of the platform resting on the ground.

In accordance with a first feature of the present invention the obliquity of the hinge pins of the wheel carrying arms is such that the wheels are at their lowermost position with respect to the platform and the platform is at its highest position with respect to the ground somewhat before the wheels have reached their normal running position during the inward return of the wheel carrying arms.

According to another aspect of this invention means are provided to prevent the rear end of the platform from coming into contact with the ground, as for instance by properly limiting the angle of rotation of the wheel carrying arms, or by disposing at the said rear end a hinged prop adapted to be swung rearwardly and upwardly when the vehicle moves forwards.

In the annexed drawings:

FIG. 2 is a representative diagram showing the movement of a wheel carrying arm and of the center of the corresponding wheel.

FIG. 3 is a fragmental plan view illustrating a modification of the invention.

FIG. 4 is an elevation with parts in section showing the rear of a vehicle according to an embodiment of this invention.

FIG. 5 is a large scale vertical section of a locking device adapted to retain the wheel carrying arms at normal running position.

Figure 1:
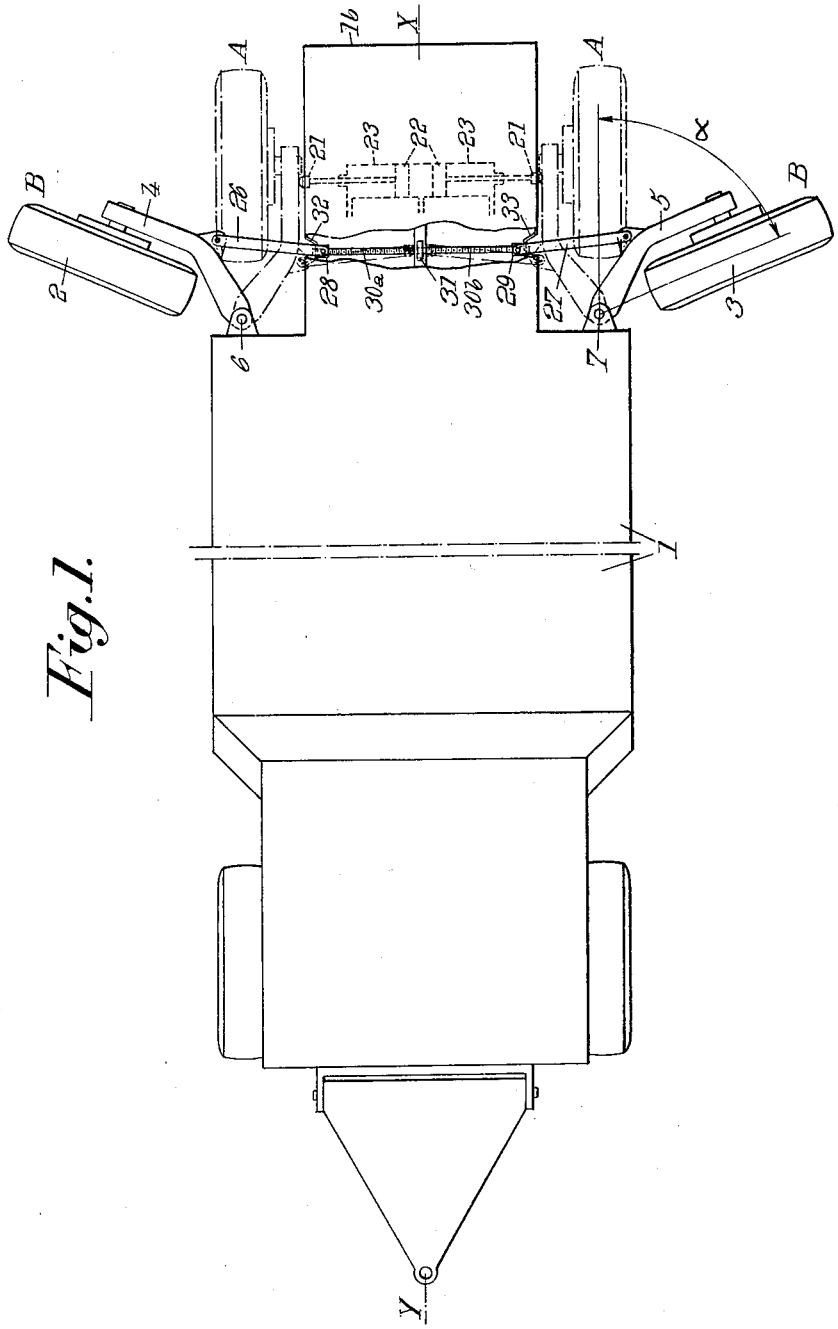
FIG. 1 is a diagrammatical plan view of a trailer according to this invention.

Referring to FIG. 1 on each side of a horizontal platform 1 of the trailer the rear wheels 2 and 3 are each supported by an arm, respectively 4 and 5, which is hinged to the frame, respectively at 6 and 7, about an axis slightly oblique with respect to the vertical plane perpendicular to the running direction X—Y or $L_1$—$L_2$, this obliquity being such that when wheels 2 and 3 are swung apart from the normal running position A, indicated in dash and dot lines in FIG. 1, to the loading or unloading position B illustrated in full lines, platform 1 sinks with respect to the centers of wheels 2 and 3 until the rear end thereof rests on the ground to form an inclined plane adapted to facilitate the loading and/or unloading operations.

Wheels 2 and 3 are normally retained at a road travel or running position A substantially parallel to the longitudinal axis $x$—$y$ of the platform of FIG. 1 by appropriate locking means. When the trailer is to be loaded or unloaded, wheels 2 and 3 are first unlocked and the trailer is then pushed backwards, which causes said wheels to swing apart to position B. When it is desired to return the trailer to normal running position, it is pulled forwards whereby wheels 2 and 3 are urged towards position A arms 4 and 5 being again locked for normal running.

However when the trailer is pulled forwards (i.e. in the direction from X to Y in FIG. 1), it may be found difficult to return the wheels completely to position A, particularly when the trailer is heavily loaded. According to this invention this difficulty is avoided by so directing the geometrical axes of the hinge or pivot pins 6 and 7 with respect to the longitudinal axis X—Y of the trailer, that there is produced on the wheel carrying arms 4 and 5 an inwardly directed force even when wheels 2 or 3, have reached their normal running position A.

This will be explained with reference to FIG. 2 which may be considered as a perspective diagram in which the platform is represented by the horizontal line $L_1$—$L_2$, while O—$O_1$ represents the oblique axis of oscillation or swinging movement of one of the wheel carrying arms coinciding with one of the pivot pins thereof. The axis O—$O_1$ of the pivot pin is oblique with respect to the plane of or parallel to the platform passing through the base O of the pivot pin. The circle having its center at O represents the possible theoretical path of the end of this wheel supporting arm, i.e. of the center of the corresponding wheel, if the corresponding arm were free to rotate about axis O—$O_1$ through 360°. The plane of this circle intersects the plane of the platform or the plane parallel thereto containing base O along line $M_1M_2$.

It will first be supposed that the line of intersection $M_1M_2$ is transverse to the platform, i.e. perpendicular to $L_2L_1$, axis O—$O_1$ then lies in the longitudinal vertical plane of $L_1L_2$. In such a case the lowermost point of the center of the wheel with respect to the platform is at C and the highermost point at D. In other words when the center of the wheel is at point C, the platform is at its highermost position with respect to the ground, while when the said center is at D the platform is at its lowermost position. It will therefore be understood that if the wheel under consideration were free to turn through any angle about axis O—$O_1$, it would normally tend to come to point D which would represent its stable position. Now, supposing the center of the wheel at point C, it could reach point D by following either path $CM_1D$ or path $CM_2D$. Both paths are fully equipalent from a theoretical point of view. But of course in actual practice, the wheel is prevented from following one of these paths by the presence of the frame which supports the platform. The right hand wheel will follow path $CM_2D$ while the left hand wheel will follow path $CM_1D$. This angular movement of the wheels (or more exactly of the wheel carrying arms) towards point D is of course limited by appropriate abutments and it may be found convenient in practice to limit the angle of rotation of the wheel carrying arms to about 90°, which corresponds to the outermost position of the wheels with respect to the platform. In the example illustrated in FIG. 1, position B of wheels 2 and 3 corresponds to an angle of rotation of arms 4 and 5 of about 70° and, as will be discussed more fully hereinafter, arm 4 follows path $A_1CB_1$. But in the diagram of FIG. 2 for the sake of simplicity it will be assumed that the angle of rotation of the wheel carrying arms is exactly 90°.

It will be supposed that the wheel supporting arm under consideration is arm 5, i.e. the arm which supports the left-hand wheel 3 in FIG. 1. As above explained the path followed by the center of wheel 3 from point C to point D is $CM_1D$. By referring to FIG. 3 which illustrates the right-hand wheel and a portion of the platform only, it will be noted that wheel 2 supported by arm 4 follows path $CM_2D$ and moves from point C to point $B_1$ through an angle $\gamma$.

Raising of the platform would of course be obtained if the center of wheel 3 went from point D to point C, which corresponds to a rotation of arm 5 through 180°. This raising could also be obtained to a lesser degree if the center of wheel 3 were brought to point C starting from any point of arc $DM_1C$, as for instance from point $B_1$. Also if instead of being stopped at point C, the center of the wheel were brought beyond C to a point such as $A_1$, the platform would still be raised provided $A_1$ is nearer to C than $B_1$. Angle $B_1OA_1$ may be made equal to 90° to correspond with the practical angle of movement of arm 5, as above explained or through an angle of about 70° in the example illustrated in FIG. 1.

Now it will be noted that point $A_1$ is situated on arc $CM_2D$. Therefore in the vicinity of $A_1$ the wheel supporting arm, namely arm 5 in the case under consideration, tends to move away from C and towards $A_1$ on the said arc $CM_2D$. It results therefrom that provided the center of wheel 3 has passed point C under the action of the forward pull exerted on the trailer, it will tend by itself to go on towards point $A_1$ under the action of the weight carried by the platform. The platform will first be raised when the center of the wheel rotates from $B_1$ to C, and it will thereafter sink somewhat when the said center passes from C to $A_1$.

It has been assumed that the line of intersection $M_1M_2$ of the plane of circumference $CM_2DM_1$ with the plane of the platform was transverse to the latter, i.e. that line $M_1M_2$ was perpendicular to line $L_1L_2$. But with such a disposition $OA_1$ would not be in a longitudinal vertical plane with respect to the trailer or, in other words, at normal running position A of FIG. 1 wheel 3 would not be exactly behind the corresponding hinge pin 7. This may be easily corrected by rotating $M_1M_2$ through a very small angle about point O in the plane of the platform until point $A_1$ is substantially behind point O, i.e. in the vertical plane which contains $L_1L_2$ ($L_2$ being the front end of the platform and $L_1$ the rear end thereof).

This rotation of $M_1M_2$ of course requires a corresponding rotation of the plane of circle $CM_2DM_1$ such rotation taking place about a vertical axis passing through point O of pivot pins 6 and 7. Finally axis $O_1O_2$ is oblique both with respect to a transverse vertical plane and to a longitudinal vertical plane passing through the base O of the pivot. FIG. 3 shows the orthogonal projection $O—O_2$ on the ground of the portion of axis $O—O_1$ above hinge 6 and as illustrated this projection is directed rearwardly and outwardly with respect to the platform. In this figure the angle of rotation or swinging movement of arm 4 about the axis $O—O_1$ of pivot pin 6, as limited for practical reasons, has been referenced $\alpha$ and is so referenced that this angle is divided by $OO_2$ which is the othogonal projection $O—O_1$ into two parts $\beta$ and $\gamma$, the angle $\beta$ (which corresponds to $A_1C$ in FIG. 2) being quite small with respect to $\gamma$ (which corresponds to $CB_1$). As noted in FIG. 3, the orthogonal projection $O—O_2$ defines with side OA of the platform parallel to its longitudinal axis X—Y the angle $\beta$ which is considerably smaller than the angle $\gamma$ defined by side $O—O_2$ and side OB which is defined by the line joining the center of the wheel 2 and pivot pin 6. Sides OA and OB are the two sides enclosing angle $\alpha$ which is composed of angle $\beta$ and $\gamma$. With regard to wheel 3 which is coupled to arm 5, it will be evident that the angle $\alpha$ as shown in FIG. 1 between sides 7–A (OA) and 7–B (OB) is also bisected by the orthogonal projection $O—O_2$ so as to divide the orthogonal projection of $\alpha$ on the ground into angles $\beta$ and $\gamma$, with the angle $\beta$ corresponding to angle $A_1—O—O_2$ and the angle $\gamma$ corresponding to angle $B_1—O—O_2$ in FIG. 2.

With such an arrangement when the wheels are at their running position they tend to move inwardly under the action of the load and therefore when the trailer is pushed backward they will not easily swing apart from $A_1$ to C (FIG. 2). It is therefore convenient to provide means to urge arms 4 and 5 outwardly at least through the small angle $\beta$ of FIG. 3.

In the embodiment illustrated these means comprise for each wheel a pusher rod 21 (FIG. 1) urged outwardly by a piston 22 which may be actuated within a cylinder 23 common to both pistons 22. Actuation of pistons 22 is effected by means of pressure fluid, it being remarked that a trailer or a tractor vehicle is generally provided with a fluid pressure line as for instance for actuation of the brakes.

Each arm 4 or 5 may support a single wheel as illustrated, or in some cases twin wheels. Each arm may also support a bogie or truck comprising two wheels arranged one behind the other, these wheels being disposed at the ends of a balancing arm hinged midway of its ends to the wheel carrying arm 4 or 5.

It is convenient to arrange each arm 4 or 5 in such a manner that the portion thereof which extends between the hinge pin and the periphery of the wheel is perpendicular to the hinge pin or is at an acute angle with the downward extension of the axis of the hinge pin. Considering FIG. 4 the portion of arm 5 extending between hinge pin 7 and the periphery of wheel 3 is perpendicular to the said hinge pin. It will be observed that with this arrangement arm 5 forms no upwardly projecting obstruction to a load running on platform 1.

It has been explained that when platform 1 is at its lower position, i.e. at its loading or unloading position, the wheels may be returned to their normal running position by merely pulling the trailer forwardly, or from the right to the left in FIG. 4. But this may be difficult or even impossible when the platform 2 has been heavily loaded owing to the braking effect of the rear end thereof resting on the ground.

In accordance with the present invention this difficulty is avoided and the trailer is easily started even under load, by providing means to prevent the rear end of the platform from being in direct contact with the ground surface.

In a first embodiment these means are in the form of abutments adapted to limit the angle $\alpha$ of rotation of the wheel supporting arms 4 and 5 to such a value that when platform 1 is at its lower position, its rear end will still be somewhat above ground level. In the example illustrated in FIG. 1, links 26 and 27 are hinged to arms 4 and 5 by their outer ends while their inner ends are pivoted to nuts 28 and 29 mounted on the respective halves 30a and 30b of a common transverse rod 30. Rod 30 is rotatably supported on the trailer frame by a central bearing 31 and by two end bearings 32 and 33, in such a manner as to be able to rotate freely without moving axially. Portions 30a and 30b are formed as opposed quick-pitch screws in such a manner that rod 30 may rotate under the combined action of nuts 28 and 29 when wheels 2 and 3 tend to swing apart or to return inwardly of the trailer frame. The angle of rotation of arms 4 and 5 is limited by nuts 28 and 29 abutting against bearings 32 and 33. Moreover rod 30 ensures that arms 4 and 5 always move quite in unison.

In a modification illustrated in FIG. 3, in which only arm 4 is shown to simplify the drawing, the trailer frame comprises for each arm 4 or 5 an abutment 44 adapted to limit the outward swinging movement of each arm to the desired angle α.

It will be appreciated that the outer bearings 32 and 33 in FIG. 1, as well as abutments 44 in FIG. 3 could be made adjustable, if desired.

In a further embodiment illustrated in FIG. 4 the rear end of the trailer frame comprises a transverse pin 45 on which is hinged a support or prop 46 whereon the frame is adapted to rest at the lower position of platform 1. The ground contacting portion 46a of this support or prop, which preferably extends across the full width of the trailer, is in the form of an arc of a circle to ensure a large area of contact with the ground and also to provide a rolling action which facilitates tilting of the prop when the trailer is advanced to raise the platform. In other words the support or prop operates as a roller or wheel and in fact such a roller or wheel could also be used. But support or prop 46 affords some particular advantages.

In the first place a wheel or roller, being circular, would extend substantially above pin 45 and would therefore require that the rear end of platform 1 be maintained at a substantial height above ground level, while prop 46 is segmental in shape and does not therefore extend substantially above pin 45. Moreover prop 46 may be formed with a lateral extension 46b which forms an auxiliary intermediate inclined plane or wedge between the end of platform 1 and the ground surface so as to provide a substantially continuous surface from the platform to the ground surface. At the normal running position illustrated in dash and dot lines in FIG. 4 extension 46b is raised and may form a plate for the registration number of the vehicle or other purposes.

FIG. 5 shows an automatic locking device adapted to retain the wheel carrying arms at the normal running position. Reference numeral 47 designates one of the longitudinal members of the vehicle frame, while 48 is a vertically movable bolt slidable in a guide 49 secured to the wheel carrying arm (arm 4 in the example illustrated). Bolt 48 is adapted to cooperate with an inclined plate 50 secured to member 47 and provided with an aperture 50a to receive the lower end of bolt 48, the latter being urged downwardly by spring 51. It will be appreciated that when arm 4 is returned inwardly, bolt 48 is raised by plate 50 until its lower end comes in front of aperture 50a and is engaged thereinto by spring 51.

Bolt 48 is formed with an upper lateral extension 53 adapted to form at the same time a follower co-acting with the oblique upper edge of guide 49, and an operating handle to permit of releasing arm 4. It will be understood that by rotating extension or handle 53 through about 180°, bolt 48 is raised against spring 51 and is thus disengaged from aperture 50a.

I claim:

1. A road vehicle comprising a load supporting platform having a loading end movable between raised and lowered positions; a pair of wheels each disposed on one side of said platform to support same adjacent to said loading end; a pair of hinges each fixed to one side of said platform, the axes of said hinges diverging upwardly and outwardly to define obtuse angles with respect to the plane of said platform and acute angles with respect to a vertical plane transverse to said platform; a pair of wheel supporting arms each having a first end hinged to said platform at one of said hinges and a second end to carry one of said wheels for rotation with said wheel in running position with its axis transverse to said platform situated on the loading end side of said hinge; and means operatively associated with said arms to maintain said loading end out of direct ground contact in lowered position; said hinge axis of each of said wheel supporting arms being oblique with respect both to a vertical plane longitudinal to said platform and to a vertical plane transverse to same to move each said wheel and said arm as a unit in such a manner that when one of said wheels is turned about the hinge axis of the corresponding wheel supporting arm, from its outermost position with respect to said platform towards said loading end thereof, said wheel passes through its lowermost position with respect to said platform to move said platform to its highest position before reaching said loading end.

2. In a vehicle as claimed in claim 1, the projection on the plane of said platform of the hinge axis of each of said wheel supporting arms being directed toward said loading end of said platform and outwardly with respect to said platform.

3. In a vehicle as claimed in claim 1, the portion of each of said wheel supporting arms which extends between the hinge axis thereof and the periphery of the corresponding wheel forming with the downward extension of said last-named hinge axis an angle at most equal to 90°.

4. In a vehicle as claimed in claim 1, means to limit at most to 90° the angle of rotation of each of said wheel supporting arms about the hinge axis thereof, between the position of the corresponding wheel adjacent to said loading end and the outermost position of the corresponding wheel.

5. In a vehicle as claimed in claim 1, pusher means mounted on said platform and unidirectionally connected to said arms thereby to urge said wheel supporting arms outwardly of said platform to bring said wheels from their position adjacent to said loading end to their lowermost position with respect to said platform.

6. A road vehicle comprising a load supporting platform having a loading end movable between raised and lowered positions; a pair of wheels each disposed on one side of said platform to support same adjacent to said loading end; a pair of hinges each fixed to one side of said platform, the axes of said hinges diverging upwardly and outwardly to define obtuse angles with respect to the plane of said platform and acute angles with respect to a vertical plane transverse to said platform; a pair of wheel supporting arms each having a first end hinged to said platform at one of said hinges and a second end to carry one of said wheels for rotation with said wheel in running position with its axis transverse to said platform situated on the loading end side of said hinge whereby, with said wheel supporting arms swung inwardly adjacent to said loading end, said wheels are at their normal running position and said platform is spaced from the ground and, with said wheel supporting arms swung outwardly said platform is lowered; and means fixed to said platform and cooperating with said wheel supporting arms for concentrating on the ground contacting surfaces of said wheels substantially all the frictional resistance to be overcome at starting said vehicle with said platform lowered.

7. In a vehicle as claimed in claim 6, said means comprising abutments to limit outward swinging movement of said wheel supporting arms.

8. In a vehicle as claimed in claim 6, said means comprising a support hinged to said platform about a transverse axis.

9. A road vehicle comprising a load-supporting platform having a loading end; a pair of wheels respectively disposed on each side of said platform to support same; a pair of wheel supporting arms each having a first end hinged to said platform about an axis at an acute angle to the vertical and a second end to carry one of said wheels for rotation with respect thereto in such a manner that said wheels are at their normal running position with their axes transverse to said platform and said platform spaced from the ground, with said wheel supporting arms adjacent said loading end, while with said wheel supporting arms swung outwardly about said hinge axes said platform is lowered to facilitate loading and unloading thereof; and means to prevent said platform from coming into contact with the ground, comprising a ramp hinged to said platform about a transverse axis and including a portion segmental in cross-section in such a manner as to be able to roll on the ground through a limited angle.

10. A vehicle comprising a load-supporting platform; a pair of wheels respectively disposed on each side of said platform to support same; a pair of wheel supporting arms each having a first end hinged to said platform about an axis at an acute angle to the vertical and a second end to rotatably carry one of said wheels in such a manner that said wheels are at their normal running position with their axes transvers to said platform and said platform spaced from the ground, when said wheels are situated substantially behind said hinge axes with respect to the normal running direction of said vehicle, while when said wheel supporting arms are swung outwardly about said hinge axes said platform is lowered to facilitate loading and unloading thereof; a transverse rod rotatably carried by said platform, one half of said rod being screw-threaded with a quick left hand pitch and the other half of said rod being screw-threaded with a quick right-hand pitch; a pair of nuts to respectively cooperate with the screw-threaded halves of said rod; links to connect each of said nuts with the adjacent one of said wheel supporting arms; and abutments to limit outward swinging movement of said wheel supporting arms to prevent said platform from coming into contact with the ground.

11. In a vehicle as claimed in claim 10, automatic locking means comprising for each of said wheel supporting arms a substantially vertical bolt slidably carried by said last-named wheel supporting arm and spring means to downwardly urge said bolt; and said operating means including for each said wheel supporting arms an inclined plate carried by said platform to cooperate with the lower end of said bolt to raise same when said last-named wheel carrying arm is returned towards said platform, said plate having an aperture to receive said bolt when the wheel carried by said last-named wheel supporting arm has reached its normal running position and cam means to raise said bolt against said spring means to release said last-named wheel supporting arm when same is to be swung outwardly.

12. A road vehicle comprising a load-supporting platform having a loading end; a pair of wheels respectively disposed on each side of said platform to support same; a pair of wheel supporting arms each having a first end hinged to said platform about an axis at an acute angle to the vertical and a second end to carry one of said wheels for rotation with respect thereto in such a manner that said wheels are at their normal running position with their axes transverse to said platform and said platform spaced from the ground, when said wheel supporting arms are adjacent said loading end, while when said wheel supporting arms are swung outwardly about said hinge axes said platform is lowered to facilitate loading and unloading thereof; and means to prevent said platform from coming into contact with the ground, comprising a support hinged to said platform about a transverse axis, said support being segmental in cross-section to be able to roll on the ground through a limited angle, and said support being formed with a radial extension adapted to form an intermediate inclined plane between the ground and said platform during loading and unloading operations of said vehicle.

13. A road vehicle for transporting heavy loads comprising a frame, having a loading end, a wheel on each side of the frame, an arm supporting the wheel on the frame adjacent to said loading end, and means pivotally connecting the arm to the frame for lateral swinging movement toward and away from the frame between a road running position adjacent said loading end at which the plane of the wheel is parallel to the direction of road travel of the vehicle and the frame is raised and a loading and unloading position at which the wheel is remote from the frame and at which the frame is lowered to the ground, the pivotally connecting means defining an axis of swinging movement characterized in that a projection onto the ground of an upward extension of the axis divides a projection onto the ground of the angle of swinging movement into two angles of different magnitudes, the smaller one of said angles having one side parallel to the direction of road travel of the vehicle.

References Cited in the file of this patent
UNITED STATES PATENTS

| | | |
|---|---|---|
| 2,431,388 | Fitzpatrick | Nov. 25, 1947 |
| 2,513,855 | Fogwell | July 4, 1950 |
| 2,774,612 | Evans | Dec. 18, 1956 |
| 2,867,339 | Nelson | Jan. 6, 1959 |
| 2,873,822 | Sloan | Feb. 17, 1959 |
| 2,879,074 | Roberton et al. | Mar. 24, 1959 |

FOREIGN PATENTS

| | | |
|---|---|---|
| 1,076,279 | France | Apr. 21, 1954 |